(12) United States Patent
Childs

(10) Patent No.: US 8,844,936 B2
(45) Date of Patent: *Sep. 30, 2014

(54) ANNULAR SEALS FOR NON-CONTACT SEALING OF FLUIDS IN TURBOMACHINERY

(75) Inventor: Dara W. Childs, College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/315,973

(22) Filed: Dec. 9, 2011

(65) Prior Publication Data
US 2012/0080853 A1 Apr. 5, 2012

Related U.S. Application Data

(63) Continuation of application No. 11/744,332, filed on May 4, 2007, now Pat. No. 8,074,998.

(60) Provisional application No. 60/746,582, filed on May 5, 2006.

(51) Int. Cl.
| F16J 15/447 | (2006.01) |
| F01D 5/20 | (2006.01) |
| F01D 11/08 | (2006.01) |
| F04D 29/08 | (2006.01) |
| F04D 29/18 | (2006.01) |
| F01D 11/02 | (2006.01) |
| F16J 15/44 | (2006.01) |

(52) U.S. Cl.
CPC .................................... F16J 15/444 (2013.01)
USPC ........ 277/414; 277/412; 277/418; 415/173.5; 415/174.5

(58) Field of Classification Search
USPC ........... 277/414, 418, 412; 415/173.5, 173.4, 415/174.4, 174.5
See application file for complete search history.

(56) References Cited

U.S. PATENT DOCUMENTS

| 1,823,310 | A | * | 9/1931 | Allen .............................. 415/48 |
| 3,589,475 | A | * | 6/1971 | Alford ......................... 188/381 |
| 4,053,254 | A | * | 10/1977 | Chaplin et al. ................ 415/116 |
| 4,242,042 | A | * | 12/1980 | Schwarz ....................... 415/116 |
| 4,512,712 | A | * | 4/1985 | Baran, Jr. ..................... 415/116 |
| 4,668,163 | A | * | 5/1987 | Kervistin ...................... 415/116 |
| 4,897,021 | A | * | 1/1990 | Chaplin et al. ............. 415/173.7 |
| 5,096,376 | A | * | 3/1992 | Mason et al. ............... 415/173.5 |
| 5,188,507 | A | * | 2/1993 | Sweeney ..................... 415/173.1 |
| 5,201,846 | A | * | 4/1993 | Sweeney ..................... 415/173.6 |
| 5,215,435 | A | * | 6/1993 | Webb et al. ................... 277/414 |
| 5,281,089 | A | * | 1/1994 | Brown et al. .............. 415/173.1 |
| 5,281,090 | A | * | 1/1994 | Starling ........................ 277/413 |
| 5,702,050 | A | * | 12/1997 | Oono ............................ 228/212 |
| 6,341,938 | B1 | * | 1/2002 | Zegarski et al. ........... 415/173.4 |
| 6,652,226 | B2 | * | 11/2003 | Albrecht, Jr. et al. ...... 415/173.4 |
| 6,739,593 | B2 | * | 5/2004 | Fried ............................ 277/411 |
| 7,334,984 | B1 | * | 2/2008 | Stine et al. ................. 415/173.1 |
| 7,402,022 | B2 | * | 7/2008 | Harper et al. ..................... 415/9 |
| 7,866,939 | B2 | * | 1/2011 | Harper et al. ..................... 415/9 |
| 8,074,998 | B2 | * | 12/2011 | Childs .......................... 277/414 |

* cited by examiner

*Primary Examiner* — Kristina Fulton
*Assistant Examiner* — Nicholas L Foster
(74) *Attorney, Agent, or Firm* — Edmonds & Nolte, PC

(57) ABSTRACT

According to one embodiment of the disclosure, an annular seal generally includes a hollow member having two ends and an inner surface. The hollow member has a number of depressions formed in and extending around its inner surface. Each of the depressions having a depth that is a function of its distance from one of the two ends.

12 Claims, 7 Drawing Sheets

US 8,844,936 B2

ANNULAR SEALS FOR NON-CONTACT SEALING OF FLUIDS IN TURBOMACHINERY

RELATED APPLICATIONS

This patent application is a continuation of U.S. patent application Ser. No. 11/744,332, filed on May 4, 2007, and now issued as U.S. Pat. No. 8,074,998, which claims priority to U.S. patent application Ser. No. 60/746,582, filed May 5, 2006. These priority documents are incorporated herein by reference in their entirety.

TECHNICAL FIELD OF THE DISCLOSURE

This disclosure relates generally to seals, and more particularly, to an annular seal for non-contact sealing of fluids in turbomachinery.

BACKGROUND OF THE DISCLOSURE

Annular seals have been implemented on turbomachinery to prevent leakage of compressible or incompressible fluids such as gases or liquids, respectively. These annular seals generally incorporate a hollow member having a number of depressions formed in its inner surface that is dimensioned to extend around a rotor portion having a relatively smooth surface. In operation, the physical relationship of the rotor surface to the stator surface causes a dynamic resistance to the movement of the fluid through the seal such that a sealing action occurs.

Common types of annular seals include hole pattern (HP) seals and honeycomb (HC) seals. Hole pattern seals generally include depressions in the form of a number of generally round-shaped holes that are formed in the inner surface of its stator portion. Honeycomb seals generally include depressions in the form of generally hexagonal-shaped holes that are formed into a lattice-shaped structure. The inner surface of the hollow member is configured in a spaced apart relation relative to the outer surface of the rotor portion so that no contact is made between the hollow member and rotor portion. In this manner, relatively little wear may be caused to the inner surface of the hollow member or outer surface of the rotor during operation.

SUMMARY OF THE DISCLOSURE

According to one embodiment of the disclosure, an annular seal generally includes a hollow member having two ends and an inner surface. The hollow member has a number of depressions formed in and extending around its inner surface. Each of the depressions having a depth that is a function of its distance from one of the two ends.

Some embodiments of the present disclosure may provide numerous technical advantages. A particular technical advantage of one embodiment may comprise an annular seal that exhibits enhanced damping over a relatively broad frequency range. The variable depth of the depressions enables unique tailoring of this damping in order to alleviate the adverse effects of operation at various revolution speeds.

Although a specific advantage has been disclosed hereinabove, it will be understood that various embodiments may include all, some, or none of the previously disclosed advantages. Other technical advantages may become readily apparent to those skilled in the art of annular seals.

BRIEF DESCRIPTION OF THE DRAWINGS

For a more complete understanding of the present invention and the advantages thereof, reference is now made to the following brief descriptions, taken in conjunction with the accompanying drawings and detailed description, wherein like reference numerals represent like parts, in which.

DETAILED DESCRIPTION OF EXAMPLE EMBODIMENTS

As previously described, the dynamic characteristics of annular seals cause dynamic resistance to the movement of the fluid such that a sealing action occurs during operation. Gas compressibility in the depressions of the surface of the annular seal function to reduce the effective acoustic velocity of the adjacent gas. This action may produce a strong frequency dependent dynamic reaction force characteristic in the annular seal. Moreover, the seal's influence on the rotor's vibration can be modeled by stiffness and damping coefficients, and these coefficients depend strongly on the excitation frequency. The seals' stiffness and damping coefficients can have a pronounced effect on the compressor's stability of lateral motion.

Figure 1:
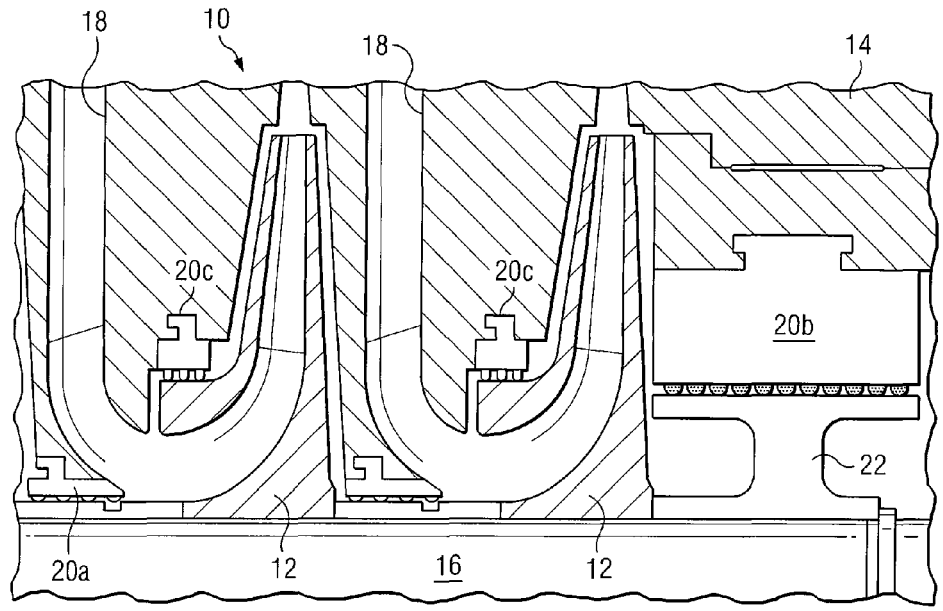
FIG. 1 is a partial cut-away view showing one embodiment of a turbomachine that may be implemented with annular seals according to the teachings of the present disclosure.

FIG. 1 shows one embodiment of a turbomachine 10 that may be implemented with annular seals according to the teachings of the present disclosure. In the illustrated example, turbomachine 10 generally includes one or more impellers 12 that are disposed in a housing 14 and rotatingly coupled to a rotor 16. Chambers 18 may be configured upstream and downstream and the front and both sides of each of the impellers 12 to facilitate controlled movement of fluids through the impellers 12. To prevent fluid leakage from these chambers 18, annular seals 20 according to the teachings of the present disclosure may be incorporated. According to the teachings of the present disclosure, these annular seals may be provided with a number of depressions, each having a depth that varies along its axial extent for dynamic tailoring of various dynamic characteristics of the turbomachine 10.

Certain embodiments of the annular seal 20 having a number of depressions that varies in depth along its axial extent may provide an advantage in that the annular seal 20 may be tailored to improve its respective damping coefficient and/or stiffness through a relatively broad frequency range. That is, selection of the depth of each of the depressions along its axial extent may provide one approach to tailoring the operating characteristics of the annular seal 20 for enhanced operation on turbomachine 10.

The turbomachine 10 may be any rotating machine on which annular seals 20 may be implemented. In the particular embodiment, turbomachine 10 is a centrifugal compressor; however, annular seals 20 according to the teachings of the present disclosure may also be implemented on other turbomachines, such as axial-flow compressors or turbines. In the centrifugal compressor shown, impellers 12 are arranged in a cascading fashion such that one chamber 18 may couple the output of one impeller to the input of another.

The annular seals 20 may be any suitable type of annular seal 20 implemented on turbomachine 10. The turbomachine 10 may have several elements, such as a rotor 16, one or more impellers 12, and/or balance pistons 22 that may be collectively referred to as rotating members. The annular seals 20 may be configured with any rotating member of the turbomachine 10 for providing a sealing action to moving fluids. As shown in this particular embodiment, annular seal 20a, generally referred to as a shaft seal, is disposed adjacent the rotor 16. In another embodiment, annular seal 20b may be configured with a balance piston 22 in which the annular seal 20b may be referred to as a balance piston seal when used with a straight-through compressor or division-wall seal when used with a back-to-back compressor. In another embodiment, annular seals 20c may be configured on the front shroud portion of impellers 12 and may refer to eye packing annular seals.

Figure 2:
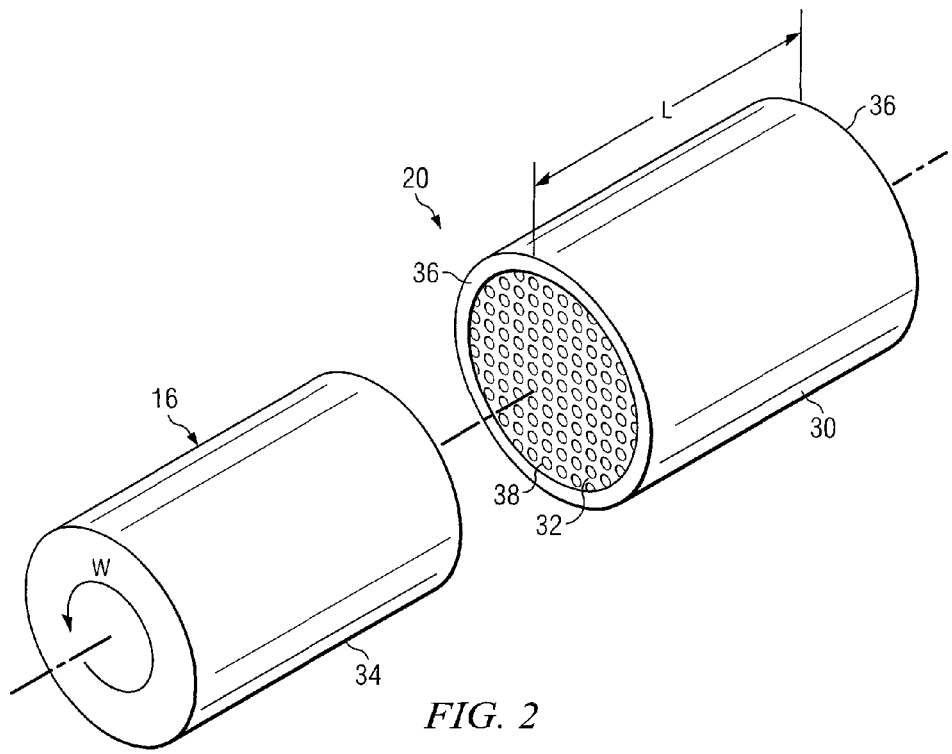
FIG. 2 is a perspective view of one embodiment of an annular seal that may be implemented on the turbomachine of FIG. 1.

FIG. 2 is an enlarged, disassembled view of one embodiment of annular seal 20 that may be used in conjunction with the turbomachine 10 of FIG. 1. The annular seal 20 generally includes a hollow member 30 with an inner surface 32 having a number of depressions in the form of holes that extend over the inner surface 32. The inner surface 32 may be dimensioned to receive a portion of the rotor 16 having a outer surface 34. As will be described in detail below, annular seal 20 may be operable to provide enhanced operating characteristics over other known annular seal designs.

Hollow member 30 may form any portion of the stator of turbomachine 10. That is, hollow member 30 may form any portion of turbomachine 10 that remains generally stationary relative to the rotor portion 16. For example, hollow member 30 may be integrally formed with the housing 14 or may exist as a replaceable component of the housing 14.

Rotor portion 16 may be any portion of the rotor 16 of turbomachine 10 such as described above. When configured within the hollow member 30, the rotor portion 16 is generally co-axially aligned with the inner surface such that the rotor portion 16 may freely rotate in hollow member 30 without making physical contact. Annular seal 20 has an axial extent L that extends along the axis of the hollow member 30 and is bounded by two ends 36.

The inner surface 32 may have any suitable shape that allows the rotor portion 16 to rotate freely inside. In one embodiment, inner surface 32 may have a generally cylindrical shape. In another embodiment, inner surface 32 may have a tapered shape such that its clearance from the rotor portion 16 at one end 36 may be different from its clearance at its other end 36. Certain embodiments may provide of the present disclosure may provide an advantage in that the varying hole depth may be significantly greater than the variation in hole depth provided by the tapered shape of the inner surface 32 and therefore, may provide enhanced tailoring of the operating characteristics of the annular seal 20.

In one embodiment, annular seal 20 is a hole pattern seal. A hole pattern seal generally refer to a type of annular seal having depressions 38 in the form of generally round-shaped holes. These hole pattern annular seals 20 may be configured to have a hole-area density of up to approximately 79%. In another embodiment, annular seal 20 is a honeycomb (HC) seal. A honeycomb seal generally refer to a type of seal in which the depressions 38 may be generally hexagonal-shaped holes that are formed into a lattice-shaped structure. In this particular embodiment shown, a number of depressions 38 are formed in the inner surface 32 of hollow member 30.

According to the teachings of one embodiment of the present disclosure, each of the plurality of depressions 38 has a depth which is a function of its distance from one of the ends 36. Annular seals 20 of this type may be generally referred to as variable hole depth (VHD) annular seals. The depth of each of the depressions 38 relative to the other depressions 38 may provide another approach to tailoring the operating characteristics of the annular seal 20 in certain embodiments. Certain embodiments of the present invention incorporating depressions 38 that vary in depth along its axial extent may provide an advantage by tailoring the effective damping and effective stiffness coefficients of the annular seal 20 to reduce adverse effects of operation at varying speeds and loads.

Turbomachines 10 such as injection compressors require comparatively long annular seals 20 with high pressure drops that have a significant impact on rotordynamics. For example, balance-piston annular seals 20b for straight-through compressors may absorb the full head rise of the turbomachine 10. The division-wall annular seal 20a incorporating back-to-back impellers, may take about one half of the turbomachine's head rise but deals with higher density gas. Hole pattern annular seals 20 using depressions 38 in the form of round-shaped holes have been recently adopted for use in some oil and gas compressors. Known annular seals made of stainless steel have been replaced by hole pattern annular seals that are made of aluminum due to their ease of manufacture. Thus, annular seals 20 of the hole pattern type may provide enhanced operating characteristics with respect to known annular seals in certain embodiments.

In one embodiment, honeycomb annular seals 20 are made from high temperature stainless steel or aluminum. The honeycomb annular seal 20 may be made from an electrical-discharge machining process or other suitable approach.

Equation (1) is one embodiment of a two-control-volume model for calculating the operating characteristics of the annular seal 20.

$$-\begin{Bmatrix} f_{sX}(s) \\ f_{sY}(s) \end{Bmatrix} = \begin{bmatrix} G & E \\ -E & G \end{bmatrix} \begin{Bmatrix} X(s) \\ Y(s) \end{Bmatrix} \tag{1}$$

Here, s is the Laplace domain variable, $f_s$ the reaction force vector, and $X(s)$, $Y(s)$ are the Laplace-domain components of the relative displacement vector between the rotor portion 16 and hollow member 30.

In terms of frequency-dependent stiffness and damping coefficients, the seal model can be approximated by equation (2).

$$= \left\{ \begin{matrix} f_{sX} \\ f_{sY} \end{matrix} \right\} = \begin{bmatrix} K(\Omega) & k(\Omega) \\ -k(\Omega) & K(\Omega) \end{bmatrix} \left\{ \begin{matrix} X \\ Y \end{matrix} \right\} + \begin{bmatrix} C(\Omega) & c(\Omega) \\ -c(\Omega) & C(\Omega) \end{bmatrix} \left\{ \begin{matrix} \dot{X} \\ \dot{Y} \end{matrix} \right\} \quad (2)$$

As can be seen, the two models are related by the terms, $G(j\Omega)=K(\Omega)+jC(\Omega)$ and $E(j\Omega)=k(\Omega)+jc(\Omega)$ where $j=\sqrt{-1}$ and $\Omega$ is the rotor precession frequency. In comparing the rotordynamic performance of seals, the effective stiffness and damping coefficients, can be approximated by equations (3).

$$K_{eff}(\Omega)=K(\Omega)+c(\Omega)\Omega, C_{eff}(\Omega)=C(\Omega)-k(\Omega)/\Omega, \quad (3)$$

The effective damping coefficient ($C_{eff}$) combines the stabilizing direct damping coefficient (C) and the destabilizing cross-coupled stiffness coefficient (k). These definitions apply only for small motion about a centered position.

The two-control-volume model described above predicted that annular seals 20 had strong frequency dependent stiffness and damping coefficients, and tests results have generally confirmed these predictions. The effective damping coefficient ($C_{eff}$) of the annular seal combines the destabilizing influence of the cross-coupled stiffness coefficient (k) and the stabilizing influence of direct damping (C). Effective damping coefficient ($C_{eff}$) is negative at low rotor precession frequencies due to stiffness coefficient (k) and positive at higher frequencies due to (C). The frequency at which it changes sign is called the cross-over frequency ($\Omega_{co}$). In applications, cross-over frequency ($\Omega_{co}$) needs to be lower than the rotor's 16 first natural frequency ($\Omega_{n1}$). Otherwise, the annular seal 20 may become destabilizing.

From a rotordynamics viewpoint, a decrease in cross-over frequency ($\Omega_{co}$) and an increase effective damping coefficient ($C_{eff}$) may be beneficial. The equations above show that gas compliance provided by honeycomb or hole pattern annular seals 20 causes a reduction in the local effective acoustic velocity. Hence varying the hole depth axially could be expected to modify the two dimensional acoustic mode shapes within the annular seal and might favorably modify its rotordynamic characteristics. Thus, equations (1), and (2) show that operating characteristics, such as cross-over frequency ($\Omega_{co}$) and effective damping coefficient ($C_{eff}$) may be manipulated by varying the depth of the depressions 38 along the axial extent of the annular seal 20.

Calculations

Calculations were obtained using a model that was similar to the two-control-volume model of equations (1) and (2) that allowed for a variable hole depth function $H_d(Z)$. The analysis was applied to an existing hole pattern seal having a radius (R) of 57.37 millimeters (mm), a length (L) of 86.06 millimeters (mm), a clearance radius (Cr) of 0.20 millimeters (mm), a supply pressure of 70 bars, and a pressure ratio of 0.5.

Figure 3:
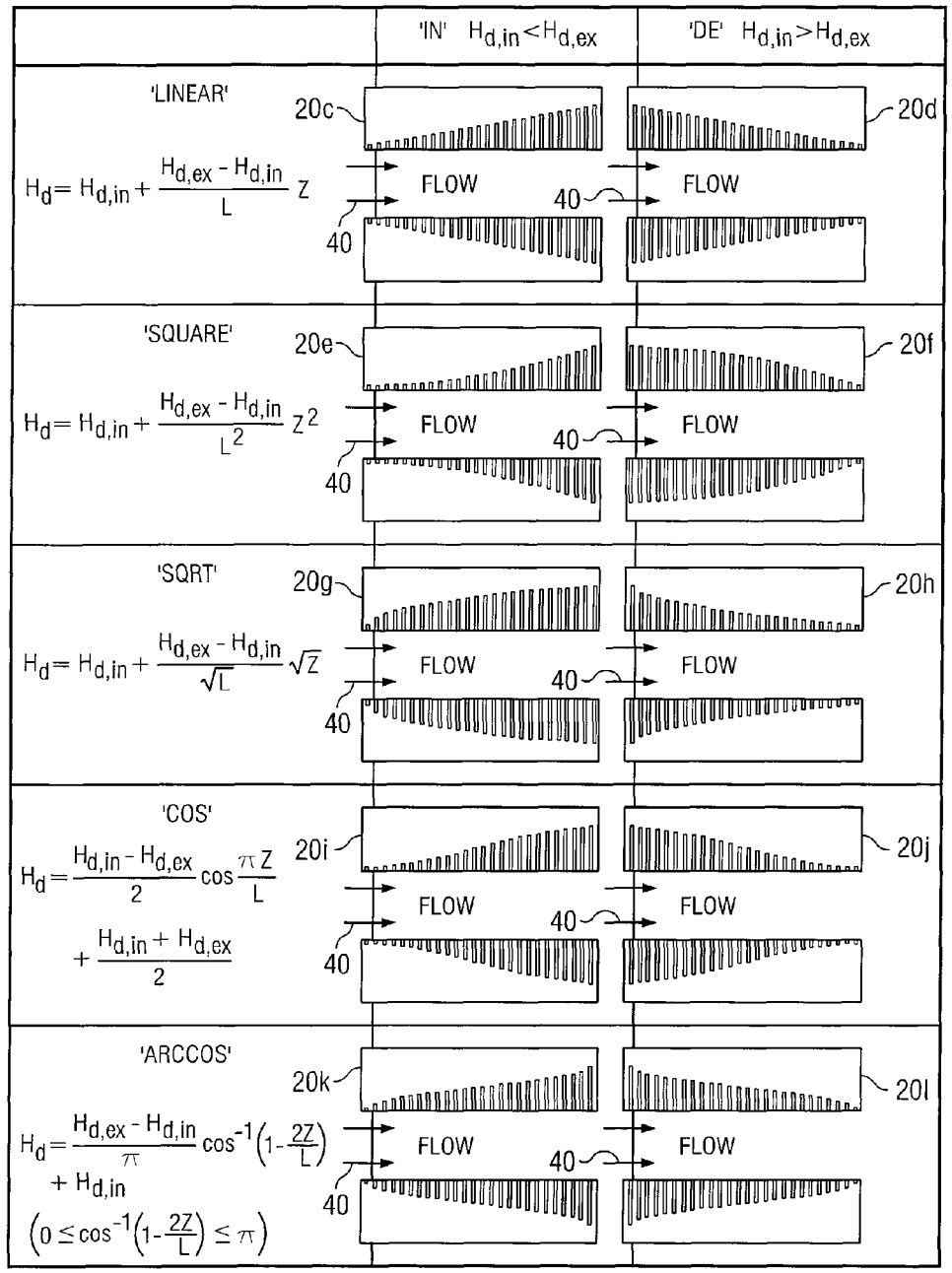
FIG. 3 is a cut-away view showing several embodiments of annular seals that may each have a number of holes, the depth of which is a function of its distance from one of its two ends.

FIG. 3 shows cross-sectional views of several embodiments of annular seals 20, each having particular hole-depth functions $H_d(Z)$ that were used in the calculations. Hole pattern annular seal 20c has a linear hole-depth function that increases along the direction of flow 40. Hole pattern annular seal 20d has a linear hole-depth function that decreases along the direction of flow 40. Hole pattern annular seal 20e has a squared hole-depth function that increases along the direction of flow 40. Hole pattern annular seal 20f has a squared hole-depth function that decreases along the direction of flow 40. Hole pattern annular seal 20g has a square root hole-depth function that increases along the direction of flow 40. Hole pattern annular seal 20h has a square root hole-depth function that decreases along the direction of flow 40. Hole pattern annular seal 20i has a cosine hole-depth function that increases along the direction of flow 40. Hole pattern annular seal 20j has a cosine hole-depth function that decreases along the direction of flow 40. Hole pattern annular seal 20k has a arc-cosine hole-depth function that increases along the direction of flow 40. Hole pattern annular seal 20l has a arc-cosine hole-depth function that decreases along the direction of flow 40.

Each of the annular seals 20c through 20l has holes, the depth of which varies as a function of its distance from one of its two ends 36. In one embodiment, holes 38 that are equidistant from one of its two ends 36 may have a relatively similar depth. In other embodiments, holes 38 that are equidistant from one of its two ends 36 may have a depths that vary from one another.

Figure 4A:
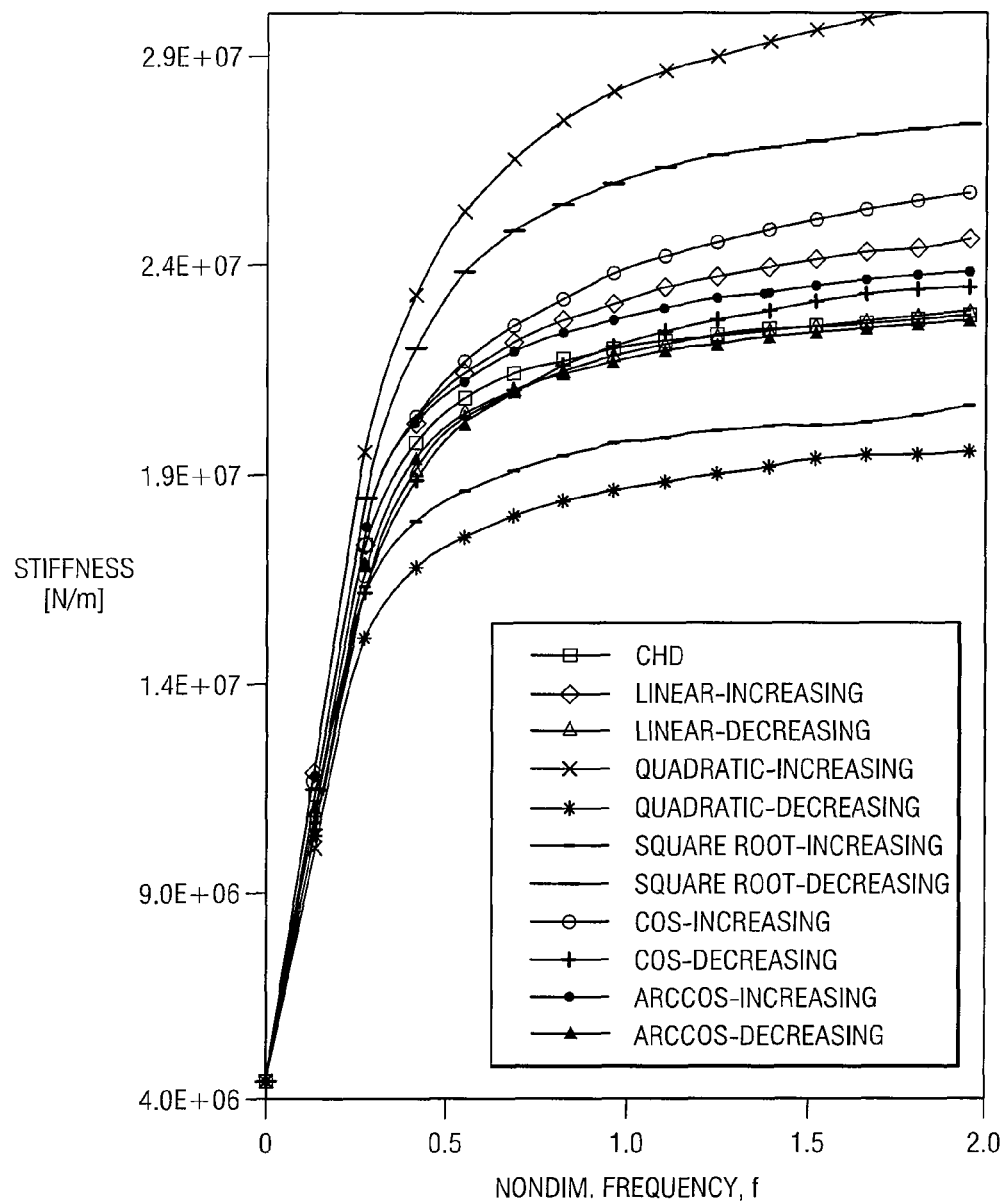
FIG. 4A is a graph representing calculations that were performed to estimate the effective stiffness of the various annular seals of FIG. 3.

FIG. 4A shows calculated values that were obtained for the effective stiffness coefficient ($K_{eff}$) for all variable hole depth (VHD) designs. Table 1 shows, in descending order for the effective stiffness coefficient ($K_{eff}$), several annular seals from FIG. 3 for a nondimensionalized excitation frequency range of 0.5.

TABLE 1

| Relative Performance (Descending Order) | Hole Depth Function ($H_d(Z)$) | Depth Relative To Direction of Flow |
|---|---|---|
| 1 | QUADRATIC | INCREASING |
| 2 | SQUARE ROOT | DECREASING |
| 3 | COSINE | INCREASING |
| 4 | LINEAR | INCREASING |
| 5 | ARC-COSINE | INCREASING |

Figure 4B:
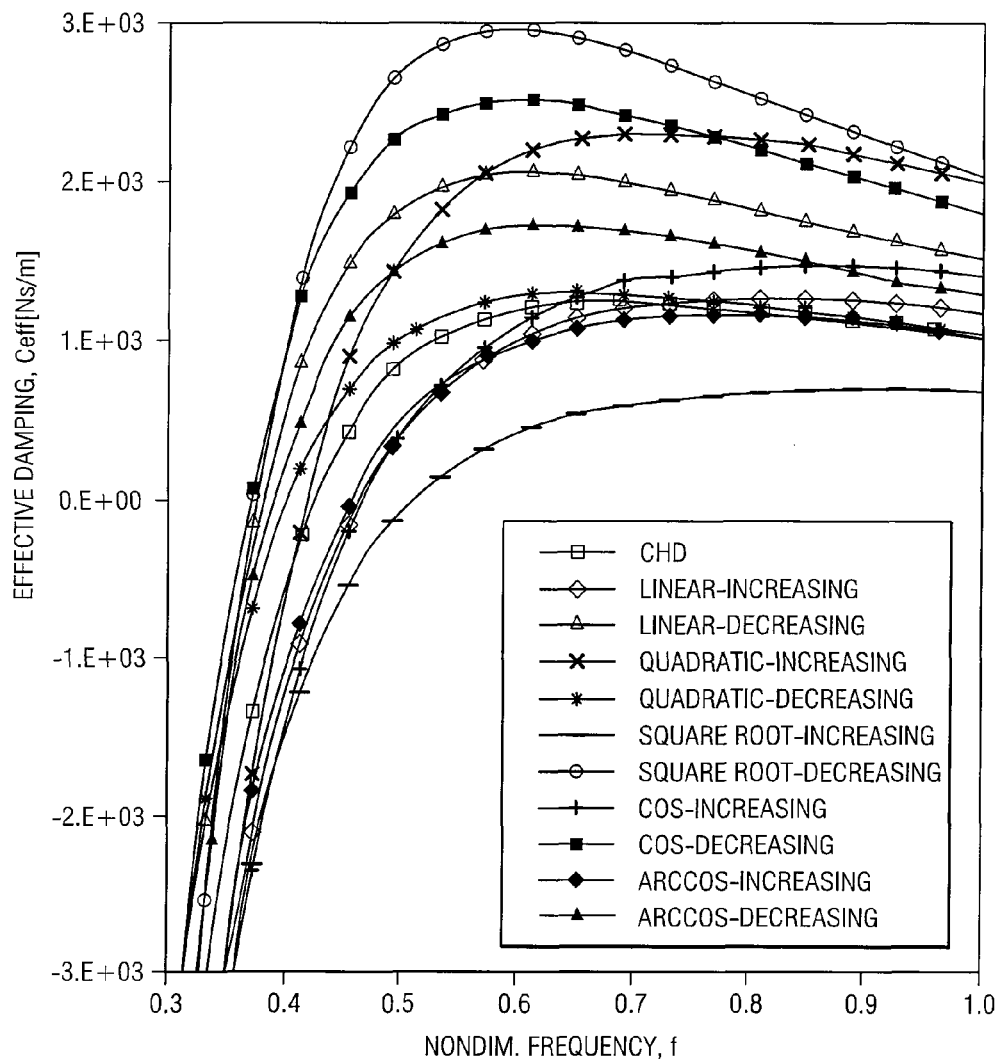
FIG. 4B is a graph representing calculations that were performed to estimate the effective damping on the various annular seals of FIG. 3.
Figure 5A:
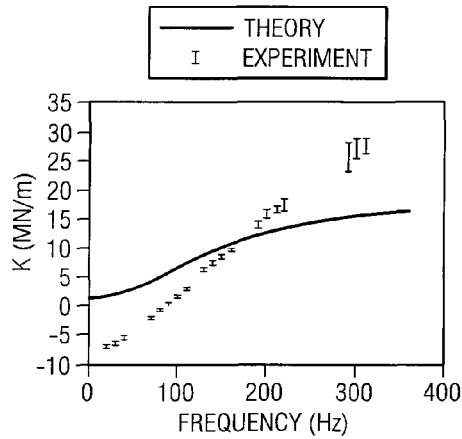
FIG. 5 shows several graphs including calculations and associated measured test data for a particular variable hole depth annular seal of FIG. 3 having a square root holed depth function that decreases along its direction of flow.
Figure 5B:
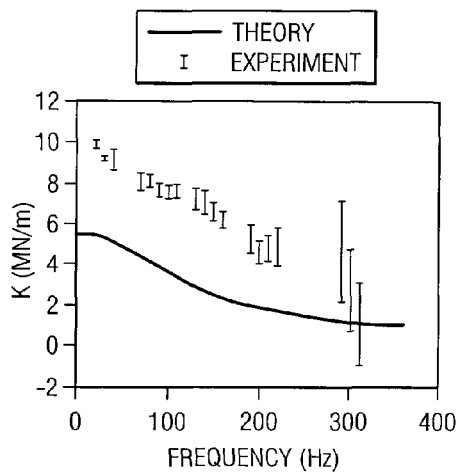
Figure 5C:
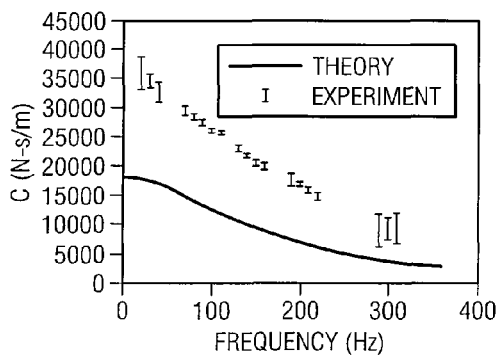
Figure 5D:
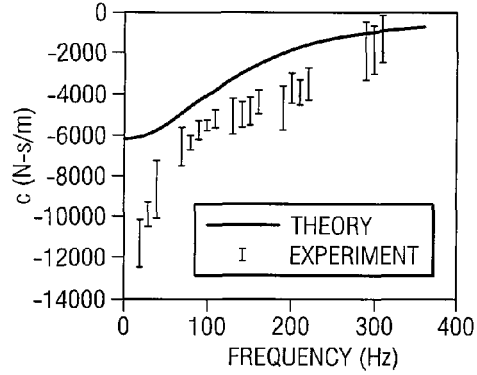
Figure 5E:
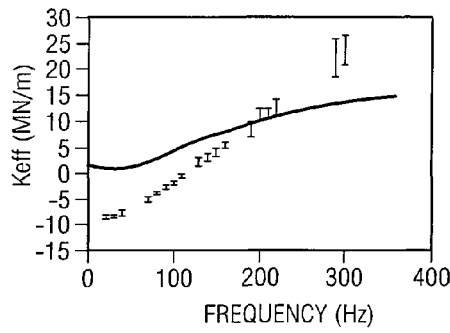
Figure 5F:
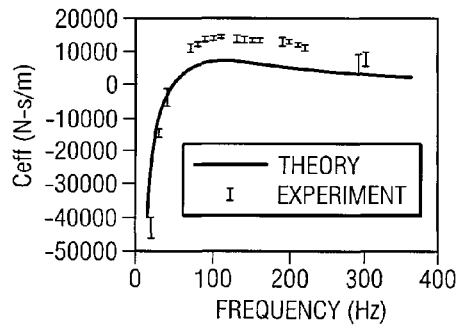
Figure 6A:
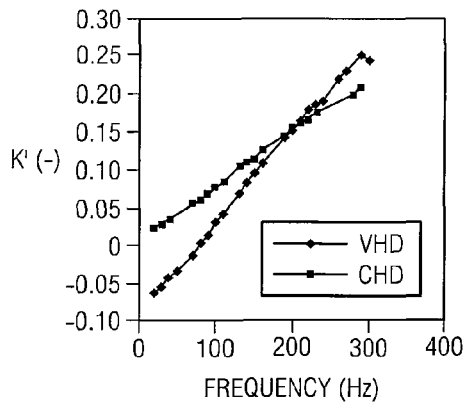
FIG. 6 shows several graphs including test data depicting nondimensionalized, measured rotordynamic coefficients for the variable hole depth (VHD) annular seal of FIG. 3 and a conventional constant hole depth (CHD) seal.
Figure 6B:
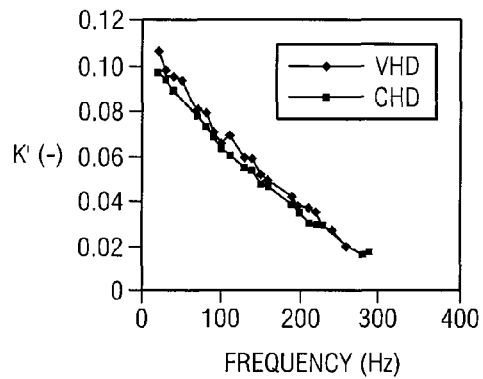
Figure 6C:
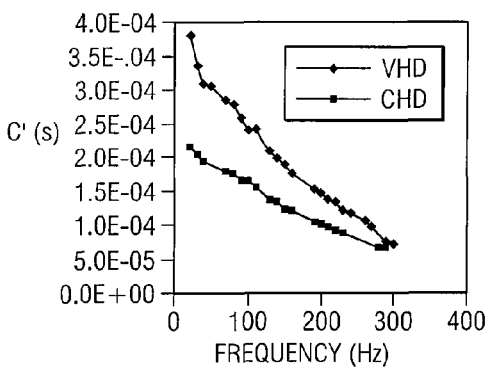
Figure 6D:
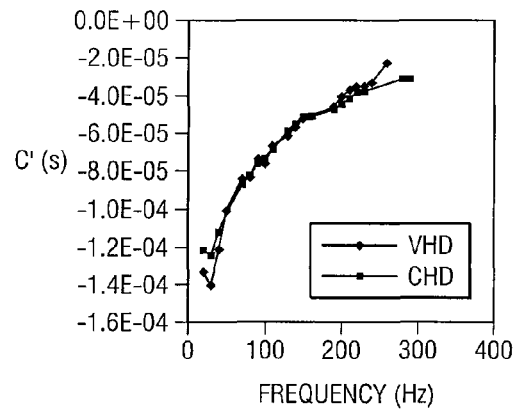
Figure 6E:
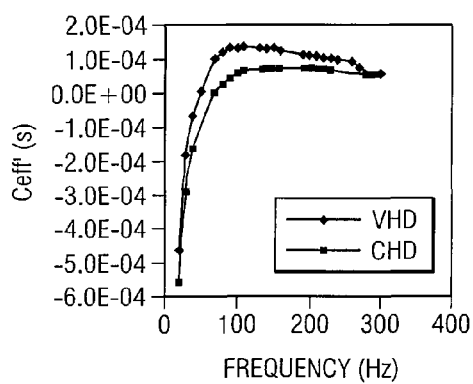
Figure 6F:
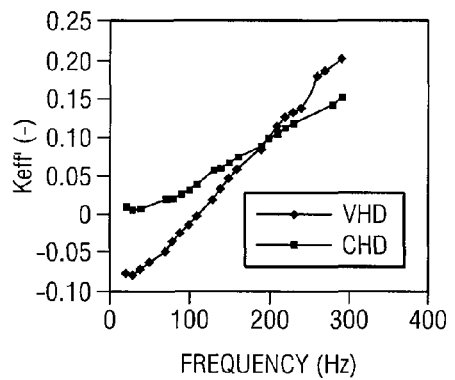

FIG. 4B is a graph showing calculated values for the resultant effective damping coefficient ($C_{eff}$) for the variable hole depth annular seals 20 of FIG. 3 having an inlet hole depth ($H_{din}$) of 3.30 millimeters (mm) zero preswirl, and running speed ($\omega$) of 20,000 revolutions per minute (rpm). In descending order, the best performers for reducing cross-over frequency ($\Omega_{co}$) are shown in Table 2.

TABLE 2

| Relative Performance (Descending Order) | Hole Depth Function ($H_d(Z)$) | Depth Relative To Direction of Flow |
|---|---|---|
| 1 | COSINE | DECREASING |
| 2 | SQUARE | DECREASING |
| 3 | LINEAR | DECREASING |
| 4 | ARC-COSINE | DECREASING |
| 5 | QUADRATIC | DECREASING |
| 6 | QUADRATIC | INCREASING |
| 7 | CONSTANT | — |

Generally, decreasing the hole depth axially along the direction of flow 40 may be productive in reducing ($\Omega_{co}$). All of the functions that give reduced cross-over frequency ($\Omega_{co}$) also yield marked overall increases in effective damping coefficient ($C_{eff}$). As shown, annular seal 20h having a square root hole depth function ($H_d(Z)$) that decreases along its direction of flow 40 is predicted to give about 2.7 times greater peak value for effective damping coefficient ($C_{eff}$) than the constant hole depth design.

As can be seen from FIGS. 4A and 4B, the square root annular seal 20h having depressions that decrease in depth along its direction of flow produces both better damping characteristics and higher effective stiffness coefficient ($K_{eff}$).

EXAMPLES

Based on the above calculations, the square root-decreasing hole-depth function annular seal 20h was selected for testing. A test apparatus was used to test the sample annular seal 20h having a square root hole depth function that decreases in depth along its direction of flow 40. The test apparatus used external shakers to excite a softly-mounted hollow member 30 that contains two identical annular seals 20h and is supported by two generally stiff hybrid bearings. Transient measurements capture components of the input excitation force, the stator acceleration, and the relative displacement between the hollow member 30 and rotor portion 16. Starting with these measurements, a frequency-domain parameter identification approach is employed to identify the Hij complex dynamic stiffness coefficients using equation (5).

$$\left\{ \begin{array}{c} F_X - m_s A_X \\ F_Y - m_s A_Y \end{array} \right\} \equiv -\begin{bmatrix} H_{XX} & H_{XY} \\ H_{YX} & H_{YY} \end{bmatrix} \left\{ \begin{array}{c} D_Y \\ D_Y \end{array} \right\} \quad (5)$$

where F, A, D, are complex fast fourier transforms (FFTs) of the applied force, stator acceleration, and relative stator-rotor displacement vectors, respectively. Diagonal coefficients (Hij) are "direct" dynamic-stiffness coefficients. Off-diagonal terms are "cross-coupled" dynamic stiffness coefficients. The test apparatus uses alternate shakes in orthogonal directions to obtain direct and cross-coupled dynamic stiffness coefficients. For motion about the centered position, theory predicts and measurements confirm that $H_{XX}=H_{YY}=G$ and $H_{XY}=-H_{YX}=E$, for E and G as described and shown in equation (1).

Steady-state measurements in the test apparatus include rotor speed (ω) plus upstream and downstream temperatures and pressures. The available supply pressures reach 70 bars, and the seal pressure ratios was varied independently of supply pressure. Tests were conducted at the following three pressure ratios: 0.3, 0.4, 0.5. The test variable hole depth (VHD) annular seal 20h produced a pronounced negative static stiffness that limited test conditions to a supply pressure of no more than 55 bars. It may be noted that division-wall or balance-piston seals of compressors normally operate at pressure ratios near 0.5 and thus, tests conducted at a supply pressure of 55 bars provide a generally realistic assessment of performance. The variable hole depth (VHD) annular seal 20h was tested with three different preswirl inserts, producing a range of pre-swirl circumferential velocity ratios. Since all current and proposed compressor applications employ swirl brakes, only zero-preswirl data was reviewed. Finally, tests were conducted at 10200, 15200, and 20200 rotations per minute (rpm), but most of the results to be presented were tested at 20200 rpm to get surface velocities that are nearer to actual compressor applications.

The tests were administered to measure rotordynamic coefficients of the annular seal 20h. However, the test procedure measured stiffness and damping arising from other elements, such as exit seals, hose connections, and the like. To account for these additional elements, base-line tests were conducted with the annular seal 20h removed. These base-line tests were conducted at reduced supply pressures to match the actual test back pressures experienced by the back-pressure seals. One set ($H_{XX}$, $H_{YY}$, $H_{xy}$ and $H_{Yx}$) of frequency-dependent dynamic stiffness coefficients were obtained as the average of thirty-two separate shake tests, which were averaged in the frequency domain.

To estimate the variability of dynamic data, ten consecutive tests were conducted at 15,200 rpm. During these tests, the operating conditions are held as constant as possible. The dynamic-stiffness data were reduced, and the standard deviation of the dynamic stiffness and rotordynamic coefficients were obtained for discrete frequencies. The standard deviation obtained from these ten sequential tests defined the uncertainty at each frequency for both the baseline tests and tests conducted with the annular seals 20h. Uncertainties in the dynamic stiffness coefficient results varied with frequency. For example, results near the line frequency of 60 Hertz (Hz) or multiples of this frequency are consistently poor. These frequencies were, therefore, avoided in creating the excitation waveform. Also, data at or near running speed are poor and are discarded. The test uncertainty is calculated at each frequency as the square root of the sum of the squares of baseline uncertainty and seal test uncertainty at each frequency. The average uncertainty is displayed on the plots of FIG. 5 as error bars for the rotordynamic coefficients. The uncertainty bars reflect +/− one standard deviation.

The first issue of interest concerns the accuracy of predictions for the annular seal 20h with varying hole depth. FIG. 5 illustrates measurements and predictions for the variable hole depth (VHD) annular seal 20h having a square root hole depth function that decreases along the direction of flow at 20,200 rpm for zero preswirl, inlet pressure ($P_{in}$) of 41.4 bars, and pressure ratio (PR) of 0.5. The zero preswirl condition is used in calculations and tests for the variable hole depth annular seal 20h because of prior test results and field experiences that have shown balance-piston or division-wall seals need swirl brakes (or shunt injection) to minimize the cross-coupled stiffness coefficient (k). Starting with stiffness coefficient (K(Ω)), the predicted and measured functions are qualitatively similar. The static stiffness is negative and fairly large versus predictions for small and positive. The relative uncertainties were reasonable. In this case, effective stiffness coefficient ($K_{eff}(Ω)$) basically coincides with stiffness coefficient (K(Ω)). For stiffness coefficient (k(Ω)), measurements and predictions are in qualitative agreement, but measured values are consistently higher by an approximate factor of 1.7 at lower frequencies. Relative uncertainties are reasonable.

Measured and predicted functions for damping coefficient (C(Ω)) are qualitatively similar, but measured damping values are higher by an approximate factor of 2. For cross-coupled damping coefficient (c(Ω)), the measurements and predictions agree qualitatively, but the measured values are higher. The relative uncertainties are higher for cross-coupled damping coefficient (c(Ω)), but this reflects the lower magnitudes for this function, more than higher absolute uncertainty. Effective damping coefficient ($C_{eff}(Ω)$) is qualitatively well predicted. The cross-over frequency ($Ω_{co}$) is closely predicted. Above ($Ω_{co}$), measured effective damping is higher than predicted by an approximate factor of 2.2.

The following nondimensionalized and normalized stiffness (K) and damping coefficients (C) will be used to compare the present variable hole depth annular seal 20h to a constant hole depth (CHD) seal. Equations (6) may be used to approximate stiffness, cross-coupled stiffness, and damping nondimensionalized comparisons between variable hole depth (VHD) annular seals 20h and known constant hole depth (CHD) annular seals.

$$K^+ = K\left(\frac{C_F}{DL\Delta P}\right), \quad k^+ = k\left(\frac{C_F}{DL\Delta P}\right), \quad (6)$$

$$C^+ = C\left(\frac{C_F}{DL\Delta P}\right)\phi = \frac{\dot{m}}{\pi DC_Y}\sqrt{\frac{R_c T_m}{2\Delta P P_m}}$$

With this approach, normalized damping coefficients have dimensions of seconds. The nondimensionalization of equations (6) are generally effective for hole pattern (HP) and honeycomb (HC) annular seals.

FIG. 6 shows several graphs providing nondimensionalized, measured rotordynamic coefficients for the variable hole depth (VHD) annular seal 20h and a constant hole depth (CHD) annular seal. The two annular seals are identical except the constant hole depth (CHD) seal had a hole depth ($H_d$) of 3.30 millimeters (mm). For both annular seals, running speed ($\omega$) of 20,200 rpm, preswirl is zero, and the pressure ratio (PR) of 0.5. The variable hole depth (VHD) annular seal 20h had an inlet pressure ($P_{in}$) of 55.2 bars, the constant hole depth (CHD) annular seal had an inlet pressure ($P_{in}$) of 70 bars. The stiffness coefficient ($k^*(\Omega)$) and damping coefficient ($c^*(\Omega)$) basically coincide for the variable hole depth (VHD) annular seal 20h and constant hole depth (CHD) annular seal. For stiffness coefficient ($K^*(\Omega)$), the variable hole depth (VHD) annular seal 20h starts with a large negative value versus the constant hole depth (CHD) annular seal's relatively low positive value. The variable hole depth (VHD) annular seal's stiffness coefficient ($K^*(\Omega)$) increases rapidly and catches up with the constant hole depth (CHD) annular seal at approximately 200 Hertz (Hz). The effective stiffness coefficient ($K^*_{eff}(\Omega)$) function closely resembles the stiffness coefficient ($K^*(\Omega)$) function for both the variable hole depth (VHD) annular seal 20h and the constant hole depth (CHD) annular seal.

The variable hole depth (VHD) annular seal 20h has a relatively higher low-frequency value for damping coefficient ($C^*(\Omega)$) than the constant hole depth (CHD) seal. The variable hole depth (VHD) annular seal 20h and the constant hole depth (CHD) annular seals have about the same values at 300 Hertz (Hz). For effective damping coefficient ($C_{eff}^*(\Omega)$), the cross-over frequency ($\Omega_{co}$) values for the constant hole depth (CHD) annular seal and variable hole depth (VHD) annular seal 20h are, respectively, 50 and 70 Hz, reflecting a reduction of about 40%. The peak values for effective damping coefficient ($C_{eff}^*(\Omega)$) for the constant hole depth (CHD) and variable hole depth (VHD) annular seals are, respectively, 7.42E-05 seconds at 160 Hertz (Hz) and 10.8E-05 seconds at 100 Hertz (Hz), reflecting an increase in peak effective damping by a factor of about 1.60.

Figure 7:
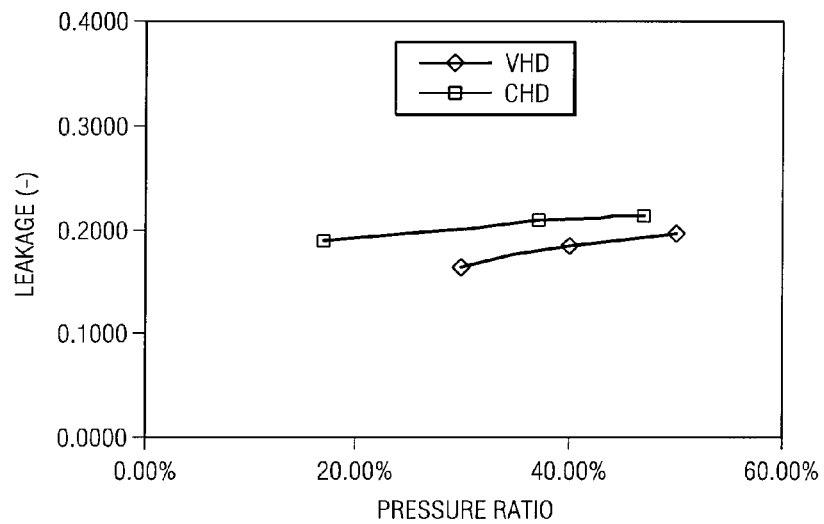
FIG. 7 is a graph comparing the relative leakage per pressure ratio of the variable hole depth (VHD) annular seal having a square root holed depth function that decreases along its direction of flow with a conventional constant hole depth (CHD) annular seal.
Figure 8A:
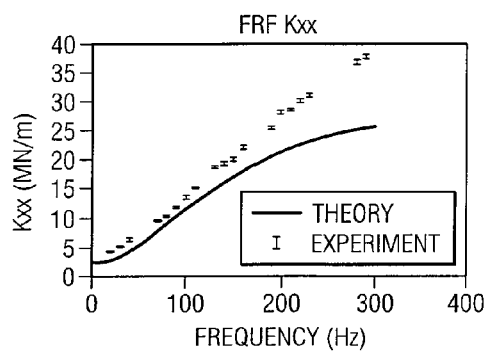
FIG. 8 are graphs showing comparisons between measurements and predictions for the constant hole depth (CHD) annular seal for comparable speed, preswirl, and clearance conditions showing comparable under predictions for stiffness coefficients (k) and damping coefficients (C).
Figure 8B:
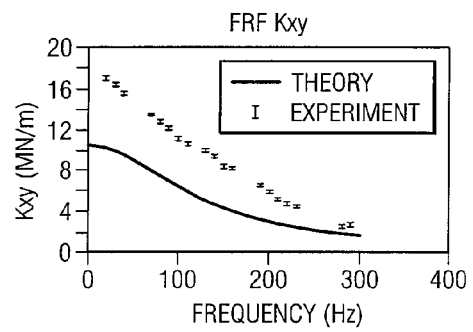
Figure 8C:
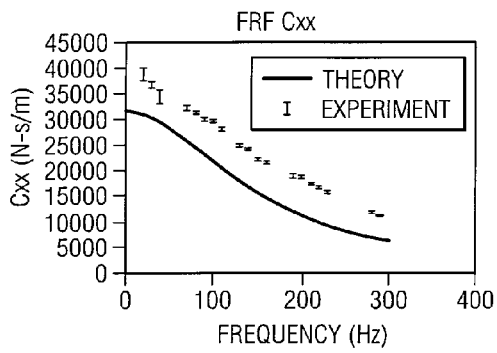
Figure 8D:
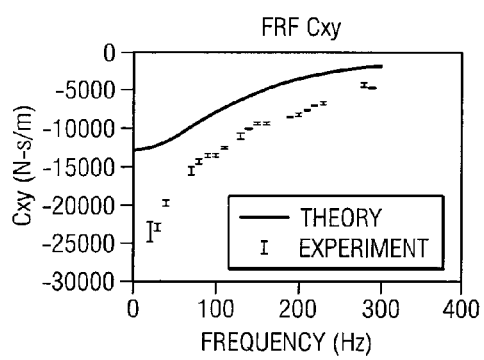

FIG. 7 provides a comparison of the constant hole depth (CHD) and variable hole depth (VHD) annular seals leakage coefficient, versus pressure ratio. The leakage coefficient ($\emptyset$) may be calculated according to equation (7).

$$\phi = \frac{\dot{m}}{\pi D C_r \left(\sqrt{\frac{R_c T_m}{2\Delta P P_m}}\right)} \quad (7)$$

In the leakage-coefficient definition, m dot is the mass flow rate, $R_c$ is the gas constant, and $T_{in}$ is the inlet temperature. As can be seen, the variable hole depth (VHD) annular seal 20h leaks less than the constant hole depth (CHD) annular seal. The difference decreases with increasing pressure ratio (PR).

The test results show that the variable hole depth (VHD) annular seal 20h can produce improved damping characteristics in terms of a reduced cross-over frequency and increased effective damping. The measured increase in peak effective damping for the variable hole depth (VHD) annular seal 20h was around 1.6 versus predictions of 2.7.

One particular observation to be made regarding the perceived increase in effective damping of the variable hole depth (VHD) annular seal 20h is that the model under predicts the dynamic stiffness coefficients for both seals by about the same amount for the test conditions shown. FIG. 8 provides comparisons between measurements and predictions for the constant hole depth (CHD) annular seal for comparable speed, preswirl, and clearance conditions, showing comparable under predictions for stiffness coefficients (k) and damping coefficients (C). Thus, the model does a relatively better job with non-zero preswirl conditions.

The pronounced negative static stiffness shown by the variable hole depth (VHD) annular seal 20h was not predicted and limited the feasible test supply pressures, ($\Delta$Ps), and clearances. Beyond a limiting supply pressure ($\Delta P$), the test rig stator would "stick" to the test rotor and could not be pulled away using the hydraulic shakers. Each shaker has approximately 4400 newton (N) static capability. This phenomenon and restriction have appeared previously while testing one honeycomb (HC) seal and several hole pattern (HP) annular seals. The constant hole depth (CHD) annular seal, with hole depth ($H_d$) of 3.30 millimeters (mm) was tested at full pressure at the two radial clearances of 0.10 and 0.20 millimeters (mm). An identical annular seal, except for a smaller hole depth ($H_d$) of 3.18 millimeters (mm), could not be tested at full pressure at the 0.10 millimeters (mm) radial clearance because of negative stiffness. Because of the negative stiffness, the present variable hole depth (VHD) annular seal 20h could not be tested effectively at any reasonable supply pressure for the reduced 0.10 millimeter (mm) radial clearance.

Seal divergence is known to cause negative stiffness. The dimensions of the variable hole depth (VHD) annular seal 20h was measured after being fitted into the test housing, and no measurable divergence could be detected. During tests, the axial pressure distribution tends to create larger clearances at the inlet leading to a converging flow path rather than a diverging flow path. Also, the gas expansion creates a significant drop in temperature as the gas moves down the seal. Again, this temperature distribution would cause a convergent flow condition with tighter exit clearances. The "friction-factor jump" phenomenon provides the most reasonable explanation for negative stiffness. Specifically, flat-plate test results for which the friction factor increases with increasing Reynolds numbers at elevated Reynolds numbers in the range of 20000.

The "Lomakin" effect predicts a positive stiffness of annular seals, resulting from the interaction of the inlet loss and friction factor when the friction-factor decreases with increasing Reynolds number, $\partial f f/\partial R_e > 0$, and a reduced or negative stiffness for the opposite behavior. The fact that the present variable hole depth (VHD) annular seal 20h leaks less than the constant hole depth (CHD) annular seal supports the idea that the variable hole depth (VHD) annular seal 20h has friction-factor jump behavior. Since the model does not account for friction-factor jump phenomenon, its failure to predict the pronounced negative direct stiffness of FIG. 5 is understandable. Note that no method exists today for predicting the occurrence of friction-factor jumps due to cavity flow phenomena for constant hole depth (CHD) or variable holed depth (VHD) geometries.

The negative static stiffness produced by the variable holed depth (VHD) annular seal 20h was a problem for this test program, because the stator was softly mounted. However, predictions suggest that negative stiffness may not be a problem in compressors because of the much higher bearing-rotor stiffness. Moreover, a small convergent taper can probably produce sufficient additional stiffness to offset any concerns due to the negative stiffness of the annular seal 20h.

The results produced here with a variable hole depth (VHD) annular seals 20*h* are not predicted for deeper or shallower constant hole depth (CHD) annular seals. The variable hole depth (VHD) configurations could readily be realized with honeycomb hole patterns that are made via electrical discharge machining, rather than standard stainless steel honeycomb (HC) surfaces.

Although the present disclosure has been described in several embodiments, a myriad of changes, variations, alterations, transformations, and modifications may be suggested to one skilled in the art, and it is intended that the present disclosure encompass such changes, variations, alterations, transformations, and modifications as falling within the spirit and scope of the appended claims.

What is claimed is:

1. A seal, comprising:
   first and second axial ends;
   a hollow member having an inner surface extending between the first and second axial ends, the hollow member having a longitudinal axis extending between the first and second axial ends, wherein the hollow member is cylindrical; and
   a plurality of depressions formed in the inner surface, each of the plurality of depressions having a depth measured from the longitudinal axis towards a bottom of the plurality of depressions inside the hollow member, the depths of the plurality of depressions progressively varying as proceeding away from the first axial end toward the second axial end as a function of axial distance from the first axial end, the function of the axial distance is an exponential function, a sinusoidal function, or a square root function.

2. The seal of claim 1, wherein the hollow member further defines a length along the inner surface extending between the first and second axial ends, the plurality of depressions being positioned along substantially the entire length of the hollow member.

3. The seal of claim 1, wherein the inner surface is tapered.

4. The seal of claim 1, wherein the inner surface maintains a nominally constant distance from the longitudinal axis.

5. The seal of claim 1, wherein the annular seal is a balance piston seal, a division wall seal, or an eye packing seal for a turbomachine.

6. The seal of claim 1, wherein at least some of the plurality of depressions are round-shaped.

7. The seal of claim 1, wherein the annular seal is a honeycomb seal in which at least some of the plurality of depressions are polygonal-shaped.

8. The seal of claim 1, wherein the inner surface has a depression-area density of approximately 79%.

9. A seal for a turbomachine, comprising:
   a hollow member having first and second axial ends, an inner surface extending therebetween, and a longitudinal axis extending between the first and the second axial ends, the hollow member defining an axial length between the first and second ends, wherein the hollow member is cylindrical and the inner surface is disposed at a nominally constant distance from the longitudinal axis; and
   a plurality of depressions defined in the hollow member and extending from the inner surface thereof, the plurality of depressions being positioned along substantially the entire axial length of the hollow member, each of the plurality of depressions having a depth measured from the longitudinal axis towards a bottom of the plurality of depressions inside the hollow member, the depths of the plurality of depressions progressively varying between the first and second axial ends as a function of axial distance from the first axial end, the function of the axial distance is an exponential function, a sinusoidal function, or a square root function.

10. The seal of claim 9, wherein the first axial end is an inlet end and the second axial end is an outlet end.

11. The seal of claim 9, wherein the first axial end is an outlet end and the second axial end is an inlet end.

12. A seal for a turbomachine, comprising:
    a hollow, cylindrical member having first and second axial ends and an inner surface extending therebetween, the inner surface being positioned at a nominally constant distance from a longitudinal axis thereof, and the hollow member defining an axial length between the first and second axial ends; and
    a plurality of depressions defined in the hollow member and extending from the inner surface thereof, the plurality of depressions being positioned along substantially the entire axial length of the hollow member, each of the plurality of depressions defining a depth, wherein the depth of each of the plurality of depressions is equal to a distance from the longitudinal axis to a bottom of each of the plurality of depressions, the depths of the plurality of depressions progressively varying between the first and second axial ends as a linear function or an exponential function of axial distance from the first axial end.

* * * * *